(12) United States Patent
Herscher et al.

(10) Patent No.: US 11,508,128 B2
(45) Date of Patent: Nov. 22, 2022

(54) SHARED ROOM SCALE VIRTUAL AND MIXED REALITY STORYTELLING FOR A MULTI-PERSON AUDIENCE THAT MAY BE PHYSICALLY CO-LOCATED

(71) Applicants: Sebastian Herscher, New York, NY (US); Kenneth Perlin, New York, NY (US); Kris Layng, Brooklyn, NY (US)

(72) Inventors: Sebastian Herscher, New York, NY (US); Kenneth Perlin, New York, NY (US); Kris Layng, Brooklyn, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 16/575,875

(22) Filed: Sep. 19, 2019

(65) Prior Publication Data

US 2020/0098187 A1   Mar. 26, 2020

Related U.S. Application Data

(60) Provisional application No. 62/734,708, filed on Sep. 21, 2018.

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC .............. G06T 19/006; G02B 27/017; G02B 2027/014; G06F 3/011; G06F 3/017; G06F 3/04815
See application file for complete search history.

(56) References Cited

U.S. PATENT DOCUMENTS

2016/0350973 A1* 12/2016 Shapira .................... G06F 3/011
2017/0358140 A1* 12/2017 Kohler ............... G02B 27/0093
(Continued)

OTHER PUBLICATIONS

Stein ("Oculus Venues brings VR crowds to real-life events, sort of", May 30, 2018, https://www.cnet.com/news/oculus-venues-brings-vr-crowds-to-real-life-events-sort-of/) (Year: 2018).*
(Continued)

*Primary Examiner* — Xin Sheng
(74) *Attorney, Agent, or Firm* — Ansel M. Schwartz (57) ABSTRACT

A system for viewing a shared virtual reality having a plurality of virtual reality headsets. Each headset producing a shared virtual reality that is viewed by persons wearing the headsets. The system comprises a communication network to which each headset is in communication to send and receive a virtual orientation and a virtual position associated with each person of the persons wearing the headsets. The system comprises a computer in communication with each headset through the network which transmits a virtual audience that is viewed by each headset. The virtual audience formed from the virtual orientation and the virtual position associated with each person wearing the headset over time as each person views the virtual story, so each person views in the headset the person is wearing the virtual story, the virtual orientation and virtual position of each other person of the persons wearing the headset. A method for viewing a shared virtual reality. A non-transitory readable storage medium which includes a computer program stored on the storage medium in a non-transient memory for viewing a shared virtual reality.

14 Claims, 7 Drawing Sheets

(51) Int. Cl.
G06F 3/04815 (2022.01)
G02B 27/01 (2006.01)

(52) U.S. Cl.
CPC .......... G06F 3/017 (2013.01); G06F 3/04815 (2013.01); *G02B 2027/014* (2013.01)

(56) References Cited

U.S. PATENT DOCUMENTS

| 2019/0098255 A1* | 3/2019 | Bergmann | G06Q 10/1093 |
| 2019/0362312 A1* | 11/2019 | Platt | H04L 65/4053 |
| 2020/0065051 A1* | 2/2020 | Tran | H04L 7/0008 |

OTHER PUBLICATIONS

UploadVR ("Oculus Venues Demo Footage—Go, Gear VR", Jun. 4, 2018, https://www.youtube.com/watch?v=IKoVaYKjYNY) (Year: 2018).*

* cited by examiner

SHARED ROOM SCALE VIRTUAL AND MIXED REALITY STORYTELLING FOR A MULTI-PERSON AUDIENCE THAT MAY BE PHYSICALLY CO-LOCATED

CROSS-REFERENCE TO RELATED APPLICATIONS

This is a non-provisional of U.S. provisional application Ser. No. 62/734,708 filed Sep. 21, 2018, incorporated by reference herein.

FIELD OF THE INVENTION

The present invention relates to a virtual reality that includes a virtual audience which watches a virtual show in the virtual reality. (As used herein, references to the "present invention" or "invention" relate to exemplary embodiments and not necessarily to every embodiment encompassed by the appended claims.) More specifically, the present invention relates to a virtual reality that includes a virtual audience which watches a virtual show in the virtual reality where the virtual audience comprises actual audience members co-located on seats.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Existing solutions for storytelling in shared virtual reality do not support a large group of audience members to be physically co-located and also to be able to see the head positions and head orientations of all of the other audience members. This lack of awareness of the position and attention focus of other audience members can lead to a lack of group engagement in an audience. In effect, each audience member feels as though they are the only person experiencing the physically collocated story.

BRIEF SUMMARY OF THE INVENTION

The present invention pertains to a system for viewing a shared virtual reality. The system comprises a plurality of virtual reality headsets. Each headset producing a shared virtual reality that is viewed by persons wearing the headsets. The system comprises a communication network to which each headset is in communication to send and receive a virtual orientation and a virtual position associated with each person of the persons wearing the headsets. The system comprises a computer in communication with each headset through the network which transmits a virtual audience that is viewed by each headset. The virtual audience formed from the virtual orientation and the virtual position associated with each person wearing the headset over time as each person views the virtual story, so each person views in the headset the person is wearing the virtual story, the virtual orientation and virtual position of each other person of the persons wearing the headset.

The present invention pertains to a method for viewing a shared virtual reality. The method comprises the steps of placing a virtual reality headset on a head of a person. There is the step of watching a virtual story in the virtual reality in the headset from a virtual audience in the virtual reality. The virtual audience comprising and corresponding to virtual orientations and virtual positions of other persons wearing other virtual reality headsets which also show the virtual story at a same time. The virtual audience and virtual story viewed by the person based on the virtual position and virtual orientation of the person.

The present invention pertains to a non-transitory readable storage medium which includes a computer program stored on the storage medium in a non-transient memory for viewing a shared virtual reality having the computer-generated steps according to the system or method described above.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
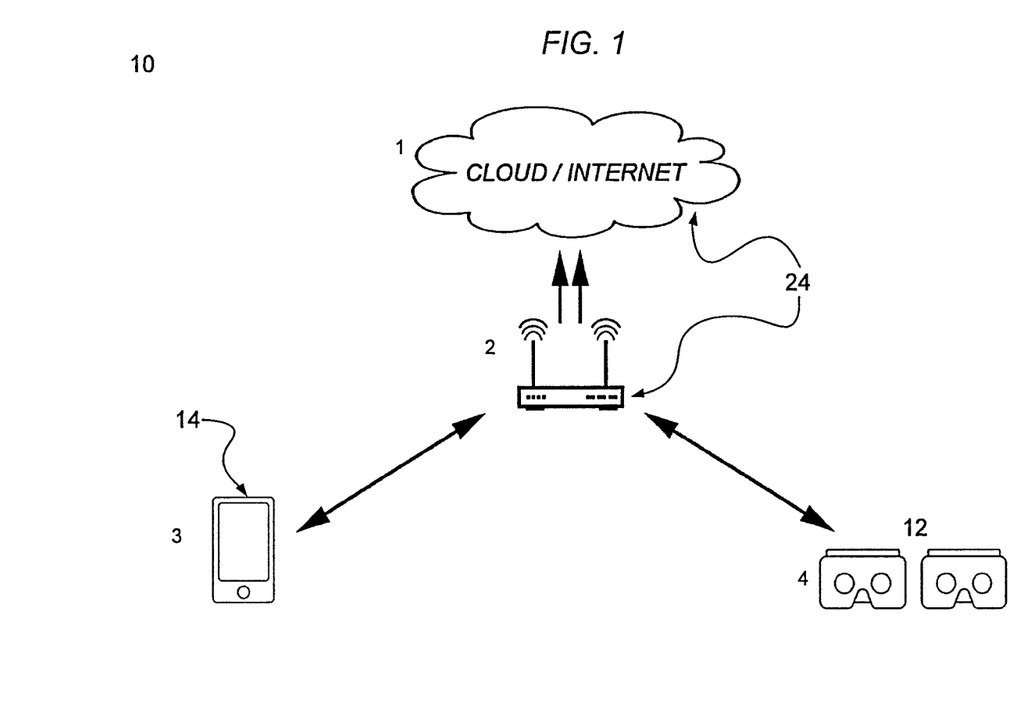
FIG. 1 is a schematic representation of the hardware of the present invention.
Figure 4:
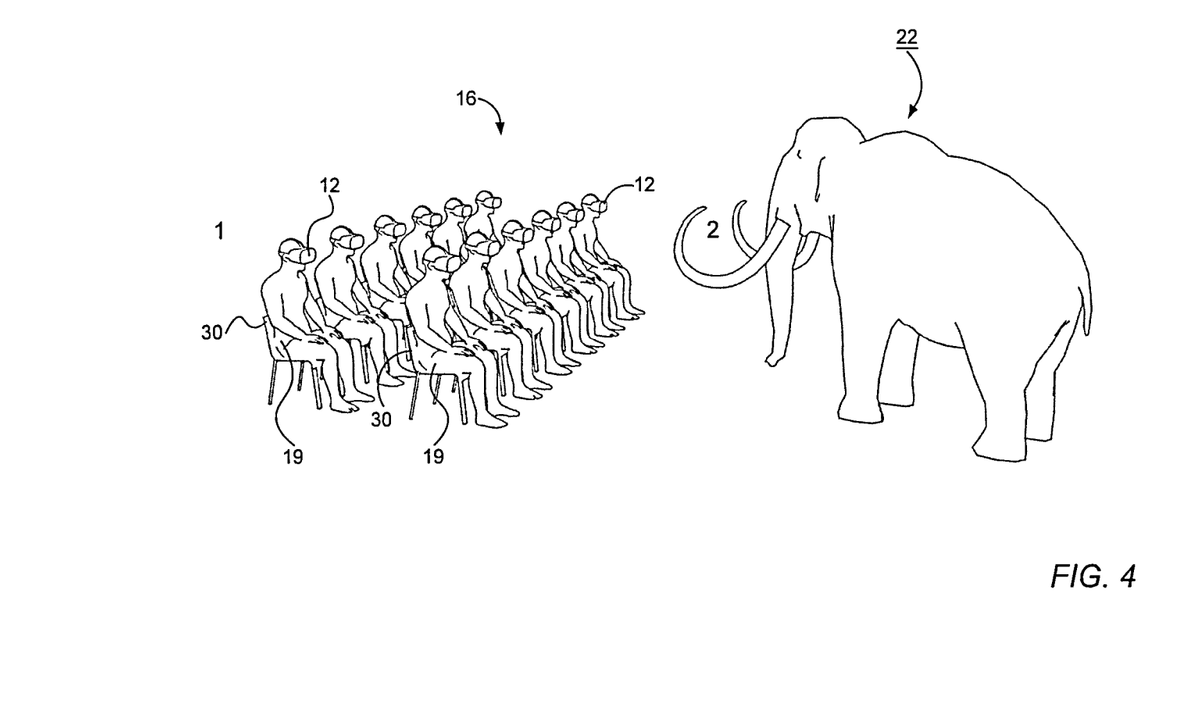
FIG. 4 shows a seated audience and a portion of the virtual reality.
Figure 7:
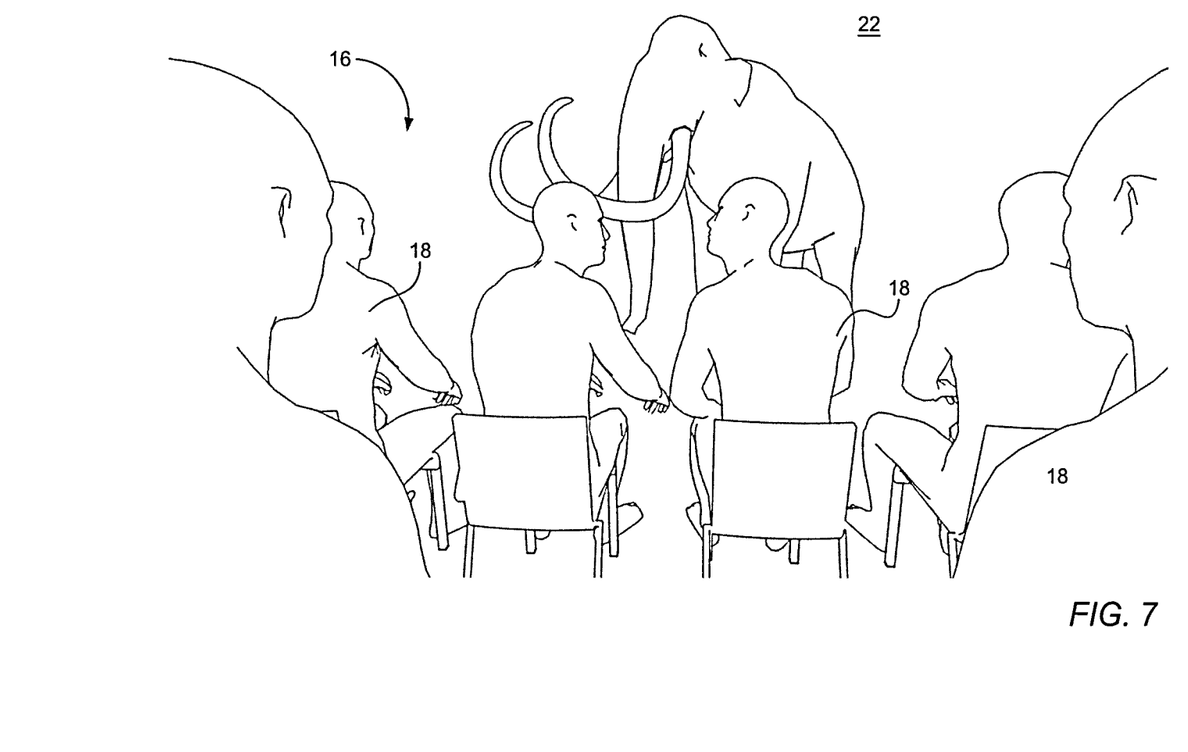
FIG. 7 shows a view of the virtual reality from the perspective of a virtual audience member.

Referring now to the drawings wherein like reference numerals refer to similar or identical parts throughout the several views, and more specifically to FIGS. 1, 4 and 7 thereof, there is shown a system 10 for viewing a shared virtual reality 22. The system 10 comprises a plurality of virtual reality 22 headsets 12. Each headset 12 producing a shared virtual reality 22 that is viewed by persons wearing the headsets 12. The system 10 comprises a communication network 24 to which each headset 12 is in communication to send and receive a virtual orientation and a virtual position associated with each person of the persons wearing the headsets 12. The system 10 comprises a computer 14 in communication with each headset 12 through the network 24 which transmits a virtual audience 16 that is viewed by each headset 12. The virtual audience 16 formed from the virtual orientation and the virtual position associated with each person wearing the headset 12 over time as each person views the virtual story, so each person views in the headset 12 the person is wearing the virtual story, the virtual orientation and virtual position of each other person of the persons wearing the headset 12.

The present invention pertains to a method for viewing a shared virtual reality 22. The method comprises the steps of placing a virtual reality 22 headset 12 on a head of a person. There is the step of watching a virtual story in the virtual reality 22 in the headset 12 from a virtual audience 16 in the virtual reality 22. The virtual audience 16 comprising and corresponding to virtual orientations and virtual positions of other persons wearing other virtual reality 22 headsets 12 which also show the virtual story at a same time. The virtual audience 16 and virtual story viewed by the person based on the virtual position and virtual orientation of the person.

The present invention pertains to a non-transitory readable storage medium which includes a computer 14 program stored on the storage medium in a non-transient memory for viewing a shared virtual reality 22 having the computer-generated steps according to the system 10 or method described above.

The virtual position associated with each audience member 19 wearing the headset 12 may include a seat 30 assigned to the headset 12 of each audience member 19 and the audience member 19 in the seat 30 positioned as seated. The computer 14 may send to the headset 12 through the network 24 when to play the virtual story. The computer 14 may send to the headsets 12 through the network 24 a current time location regarding the virtual reality 22.

Each headset 12 may send a registration signal through the network 24 to other headsets 12 which includes a runtime representation that is used in the virtual reality 22 to render a representation associated with each headset 12 in the virtual reality 22. Each headset 12 sends a virtual position and a virtual orientation associated with the headset 12 to the other headsets.

The computer 14 may send a timestamp to the headsets 12 through the network 24 which the headsets 12 use to synchronize the virtual reality 22 between the headsets 12. The computer 14 may render each runtime representation of the virtual audience 16 as an avatar 20 whose position and orientation are updated a plurality of times per second. The computer 14 may render each avatar 20 in the virtual reality 22 as a seated humanoid model, whose head joint position and orientation are manipulated using the position and orientation received through the network 24 and results each audience member 19 being able to see a virtual visual representation of the position and movements of all other audience members 19 who are currently in each audience member's field of view in the virtual reality 22.

The position and orientation of the avatars 20 in the virtual reality 22 may correspond to actual physical positions, orientations and movements of the audience members 19. The computer 14 may render a viewpoint in the virtual reality 22 for each headset 12 from the seat 30 assigned to the headset 12 and the audience member 19 of each seat 30 is able to see the movement of all other audience members 19 currently within the audience member's field of vision in the virtual reality 22 thereby supporting a sense for each audience member 19 that they are part of a live physical audience. The computer 14 may render the viewpoint of the virtual reality 22 unique, different and distinct for each headset 12. The computer 14 may send when to play the virtual reality 22 and the current time location regarding the virtual reality 22 as key-value pairs. The network 24 may include a WiFi router 23 and a standard network 24. The computer 14 may include a smart phone, which has the master client which is in communication with its computer 14 stored in its non-transient memory. Each headset 12 has the client application stored in its non-transient memory which is in communication with its computer 14. Each headset 12 has a display on which the computer 14 of headset 12 displays the virtual reality 22.

In the operation of the invention, the system 10 and method allow multiple collocated viewers of an audiovisual story to have a shared social experience, with the full benefit of seeing each other in positions that correspond to their actual locations in the room, as well as seeing where all the other audience members 19 are looking. This visceral sense of social sharing fundamentally changes the nature of how VR is experienced, creating an experience that is much closer to the traditional audience experience of viewing cinema or theater than is the case for VR storytelling in the current state of the art.

Each audience member 19 is seeing and hearing an audiovisual narrative experience that is rendered locally on the computer 14 that drives their individual VR headset 12. The audience member 19 sees and hears this experience in "room scale". Note: "Room scale" is a term of art in VR, which means that as a user translates their head position, what is seen and heard seems to that user to translate correctly, as though the experience is physically in the same room as the user. "Room scale" is often contrasted with "360 degree VR", which does not respond in any way when the user translates their head position.

Meanwhile, each user is also able to see the changes in head position and orientation of all other audience members 19 in their field of view. The current invention creates the illusion that the audiovisual narrative experience and the position and head movements of other audience members 19 are coexisting in the same constructed computer 14 animated world.

The fact that every audience member 19 sees and hears the story from their own unique perspective in the shared story world, and that this perspective corresponds to their actual location in the physical world, and that each audience member 19 also has the experience of seeing the actual head movements of the other audience members 19 around them, and that all of this is intermixed with the audiovisual narrative experience itself, creates a new opportunity to present stories in a way that retains much of the physical immediacy and sense of shared physical presence of live theater, while also allowing for the advantages afforded by cinema of possessing far greater opportunities for wide distribution than is possible in live theater, as well as the ability which cinema provides to show content that is unrestricted by the bounds of the laws of physical reality.

The system 10 and method allow for at least dozens of participants in a seated position to see themselves and each other as live virtual audience 16 avatars whose position and movements correspond with the participants physical position and movements, during which every participant watches a pre-existing experience from a unique virtual viewpoint.

Inventory of Physical Parts

Software Parts:
1. One (1) Master Client Application.
   a. The master client application is responsible for controlling the state of the shared experience. It is responsible for sending data and signals to all client applications. Examples of the data include the current timestamp of an experience, which the client applications can use to render the correct part of the experience.
2. One or more (1+) Client Application.
   a. The client application is responsible for two jobs:
      i. Rendering and displaying the shared experience on the headset 12. The client will use data and signals received from the master client application to determine what part of the experience to render and display.
      ii. Send data to all other client applications and the master client application. Examples of parts of the data include the virtual position and orientation of the user, calculated by the headset 12 on which the client application is installed.

3. One standard networking service, such as Photon Networking.

a. The standard networking service is used for sending signals and data to and from the master client application and all client applications, and in between all client applications.

Physical Parts: (See FIG. 1)

1. One (1) Desktop Computer or smartphone, on which the master client application is installed.
2. One (1) Wifi Router, which all devices with an installed client application or master client application are connected to.
3. One or more (1+) standalone virtual reality 22 headset 12 or desktop virtual reality 22 setup, on each of which a client application is installed.
1. The standard networking service can use a server either in the cloud (on the internet), or on a local network 24.
2. A WiFi router, responsible for connecting the master client application and the client application(s). Internet connectivity is only required if the standard networking service requires it.
3. A smartphone, on which the master client application is installed and run.
4. One or more virtual reality 22 headsets 12, each of which have a client application installed and running.

Step by Step Operation by User

Operator Step By Step:

Setting Up Each Headset 12:

The operator turns on the virtual reality 22 headset 12, or the desktop the virtual reality 22 headset 12 is connected to.

The operator launches the client application on the virtual reality 22 headset 12 or desktop.

Setting Up the Master Client:

The operator turns on the computer 14 or smartphone.

The operator launches the master client application on the device.

The operator assigns each connected headset 12 to a seat 30, through a graphical user interface.

The operator presses play on the master client application to begin the experience.

After the experience is completed, or at will, the operator presses the reset button on the master client application to reset all clients.

Audience Member 19 Step by Step:

The audience member 19 sits down in a physical seat 30.

The audience member 19 places the headset 12 on their head.

If the experience includes controllers, the audience member 19 picks up the controllers.

The audience member 19 experiences the immersive experience.

After the experience is completed, or at will, the audience member 19 removes their headset 12. If the experience includes controllers, the audience member 19 returns the controllers to the seat 30, operator, or controller holding location.

Step by Step Internal Operation in Preferred Embodiment

Communication Between Applications

The communication between applications can be performed on top of any standard networking service. In one embodiment, the communication sent between applications can be in the form of a key-value pair, where both the key and value are a piece of text or a number. Each application can send to all other applications a signal or set of signals (data) in the form of key-value pair(s), which is stored in each receiving application and is used for changing some aspect of the experience. For example, the master client application can send a Play signal to all client applications in the form of the key-value pair ("play", 1), which is received by all client applications. The client applications then update its local representation of the value based on the key "play", and then play the experience accordingly. In another example, the master application periodically sends the current time location of the experience to all client applications. This signal can take the form of a key-value pair ("time", 65.67 . . . ), which is received by all client applications, updated, and used accordingly. The master client application and all client applications keep and update a dictionary of these key-value pairs.

Client Application

The client application can take the form of an application on a standalone virtual reality 22 headset 12 or a desktop virtual reality 22 setup. Using an embodiment of the communication protocol described above, each client application has the following capabilities:

Send a registration signal to all other client applications and the master client application.

When a registration signal is received by a client application, that application creates a runtime representation of the sending client. This virtual representation is used in the rendering process to correctly render a representation (such as an avatar 20) of the other client in the virtual environment of the experience.

Send periodic update signals to all other client applications.

In one embodiment, these periodic update signals consist of data about the sending client application:

The virtual position of the client application, generated by the tracking solution of the virtual reality 22 headset 12

In one embodiment, this virtual position is generated by Google's Daydream algorithm which is available on the Google Lenovo Mirage Solo headset.

The result of this algorithm is available at runtime in code, and is collected by the client application during every render frame.

The virtual orientation of the client application, generated by the tracking solution of the virtual reality 22 headset 12

In one embodiment, this virtual orientation is generated in the same fashion as described above.

If a master client application is sending a timestamp of the current point in the experience, the client application will adjust its rendering of the experience to that moment in time. Rather than taking effect immediately, this synchronization signal can be used to slightly alter the rate of the clock that is running the game engine contents. The difference (dt=transmitted time from the server−local clock time) is computed. The local game clock rate is then given as the local processor's internal clock rate multiplied by a factor of (1+dt/N). In practice, this technique ensures that there will not be any difference in perceived time between audience members 19 greater than 100 milliseconds, and also that there will not be any perceived sudden time shifts as a result of this synchronization process.

The client application is also responsible for rendering the experience on the virtual reality 22 headset 12. Events in the experience occur at different points in time in the experience, in a linear fashion, much like a movie or theater experience.

Master Client Application

The master client application can take the form of a computer 14 executable application or smartphone application. Using an embodiment of the communication protocol described above, the master client has the following capabilities:

Play, pause, fast forward, rewind, or restart the experience.

Assign a specific value, such as a seat 30 number, to any client application.

Send a specific value, such as a timestamp, to all client applications.

The master client application, in one embodiment, has a graphical user interface that uses standard visual representations of each functionality, such as the representations present on a remote control.

The master client application is responsible for maintaining the synchronization of the experience between all client applications. In one embodiment, the master client application does this by periodically sending a signal representing the timestamp of the current point in the experience each client application should be at. See FIG. 2.

Figure 2:
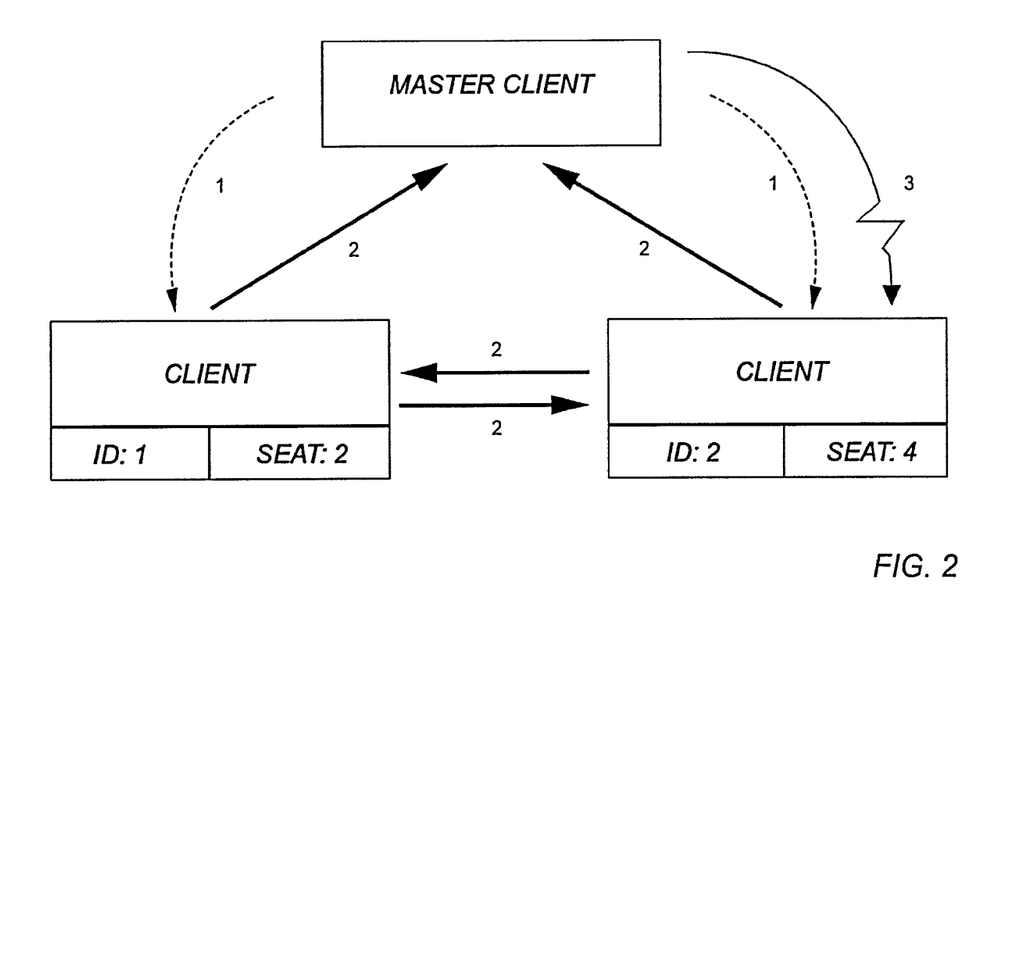
FIG. 2 is a block diagram showing the relationship between the master client and the clients.

1. The master client sends the timestamp data to the client.
2. Each client sends the compressed position/orientation data to each other client and the master client.
3. The master client sends a seat 30 assignment signal to the client.

Figure 3:
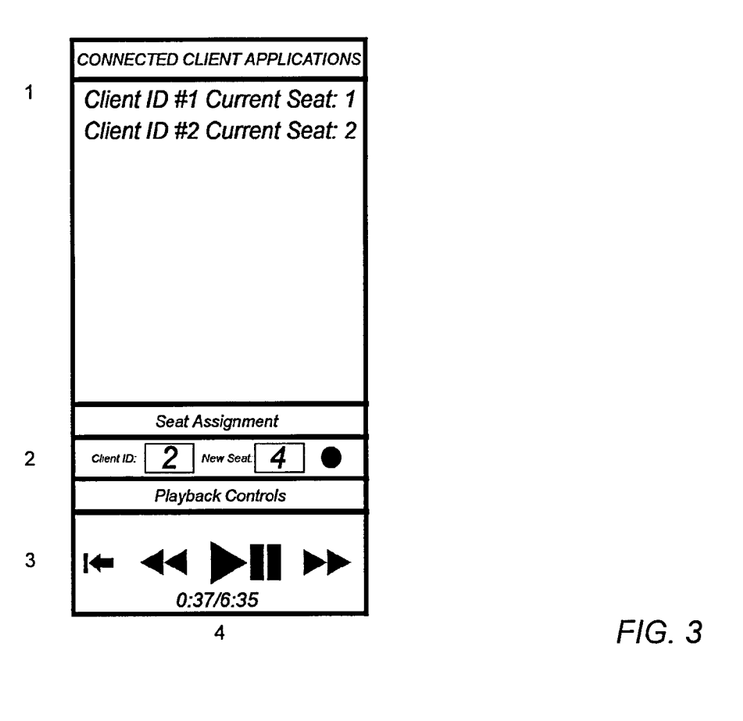
FIG. 3 shows a display of the master client application regarding the status of all connected client applications.

See FIG. 3.

1. The master client application displays the status of all connected client applications.
2. The master client application can assign any connected client application to a seat 30.
3. The playback controls for the experience. From the left: reset, rewind, play/pause, fast forward.
4. The current timecode of the experience. The master client sends this as a timestamp to all client applications, which will render the correct part of the experience based off of this data.

Representation and Placement of an Audience Member 19 in the Experience

The client application, which can be built using a standard game engine such as Unity, runs on the VR headset 12 for each audience member 19 and renders an avatar 20 which visually represents each of the other audience members 19. The virtual position and orientation of each of these avatars 20 is updated at a determined n times per second (such as n=20) using the data received via network communication from the instance of the client application miming on each of the other audience members' VR headsets 12.

Unity allows for the addition of external computer 14 programming code within their game engine, in order to provide developers with the capability to create custom implementations. Unity also allows the control of avatar 20 models through the positioning and manipulation of a series of joints such as the neck, head, back, arms and other joints of a humanoid avatar 20. In the system 10, an avatar 20 representing a client application is represented as a seated humanoid model, whose head joint position and orientation are manipulated using the position and orientation data received through the network 24, as described above. This is done by setting the position and orientation of the head of the avatar 20 using the received code, and then updating the chest and neck joints of the avatar 20 using a standard inverse kinematic algorithm such as the Jacobian inverse technique. This process results in each audience member 19 being able to see a virtual visual representation of the position and movements of all other audience members 19 who are currently in that audience member's field of view, and those perceived positions and orientations can correspond to the actual physical positions, orientations and movements of those other audience members 19.

Each client application is assigned to a virtual location in the experience. These virtual locations will be referred to as seats 30. For each client application, the master client application can change which seat 30 the client application is assigned to. The seat 30 determines the unique viewpoint of the experience for each audience member 19. For example, if there is a row of seats 30 in the experience, and one client is assigned to the 3rd seat 30, the experience will be rendered from the viewpoint of the 3rd seat 30. If another client is assigned to the 4th seat 30, their viewpoint will be rendered from the 4th seat 30, and the occupant of each seat 30 will be able to see the movement of all of the other audience members 19 currently within their field of vision, thereby supporting the sense for each audience member 19 that they are part of a live audience.

The location of a seat 30 will also change the rendering of the content of the experience. In one embodiment, a piece of content is located in the center of an experience, and two seats 30 are located, respectively, on the left and right sides of the content. That content will be rendered as though it is more from the left, if the audience member 19 is seated in the seat 30 that is more to the left. The same content will be rendered as though it is more from the right, if the audience member 19 is in the seat 30 that is more to the right.

The mapping of a set of seats 30 in the virtual experience may or may not need to map to the physically corresponding seats. In one embodiment, two sets of seats 30, a left group and a right group, are set up. The physical distance between each seat 30 in each group correctly corresponds to the virtual distance between each seat 30 in that group, but the physical distance between the two groups of seats can be significantly smaller or larger than the virtual distance between them.

During the production of the experience, the seating model described above can be used to view the content from each potential viewpoint of the audience. This is vital to the fidelity of the experience, as each seat 30 will have a different viewpoint in the experience, and the position and orientation of each piece of content in the experience will be rendered differently for each individual audience member 19 based on the viewpoint of that audience member 19.

See FIG. 4.

1. The virtual audience 16 avatars, which are rendered by each client application.
2. A piece of virtual content that is rendered by the client application.

Note that the front row of the audience avatars is rendered in between the virtual content and the back row of audience avatars.

Figure 5:
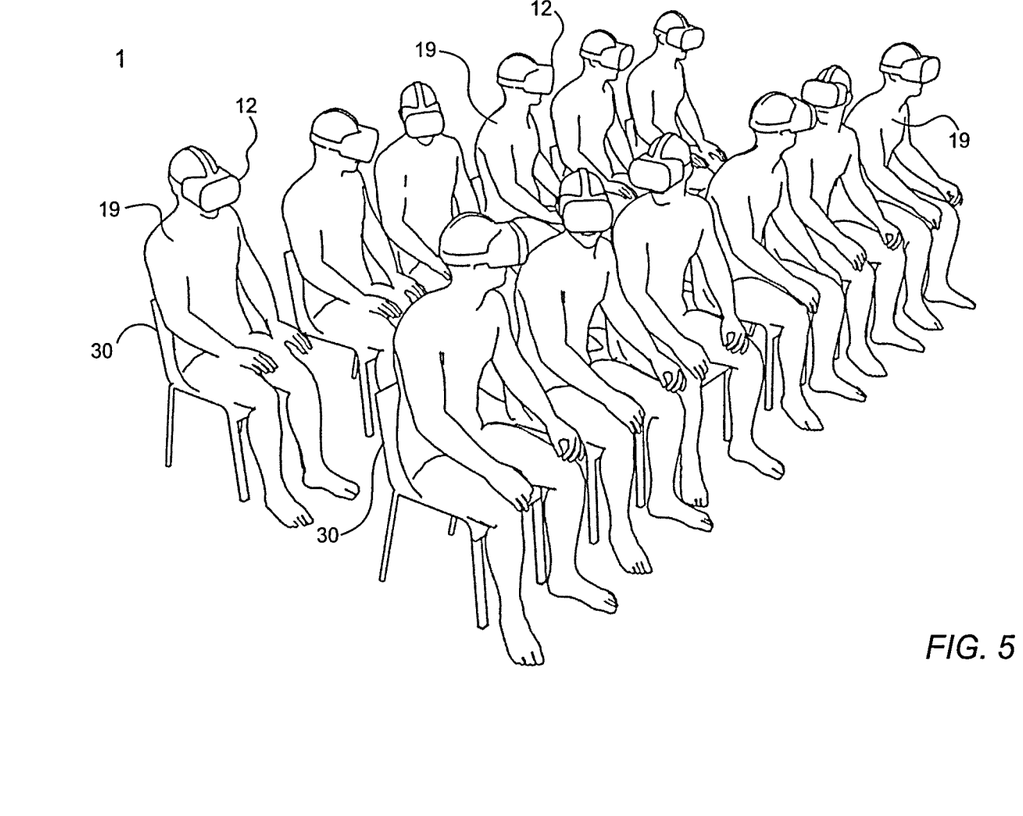
FIG. 5 shows a seated audience.

See FIG. 5.

1. The audience avatars head and chest position and orientation is updated based on the position and orientation data sent by each client application. In this figure, each user can see when each other user turns and moves their head/chest. This is vital in evoking a sense of audience presence in the virtual experience.

Optimizations Gained by Enforcing a Seated Audience

The invention requires a seated audience model. The audience is seated in a stationary chair while wearing the virtual reality 22 headset 12. Two major optimizations are gained from this model: 1) the safety of the audience members 19 is greatly increased, as the risk of injuring oneself when colliding with physical objects not represented in the virtual world is mitigated, and 2) the fidelity and range of the data representing the virtual position and orientation of each user can be greatly compressed.

For a seated audience member 19, significant data compression of the transmitted head position and orientation of each audience member 19 is possible, by taking advantage of the limited positions that are possible for an audience member 19 who is sitting down. This compression is affected as follows: A point centered at the middle of the seat 30 of each audience member 19 and at a height of 1.3 meters above the floor is taken as a local origin for the head position of that audience member 19. A coordinate system is then established in which the lowest value in each dimension (x,y,z) is taken as 0.5 meters in one direction, and the highest value in that dimension is taken as 0.5 meters in the opposite dimension.

By transmitting each positional value as a 10-bit quantity, the location along each of these three orthogonal positional axes can be specified to an accuracy of $1/1024$ meters, or approximately 1 mm (1/25.4 in). In one embodiment, standard smoothing such as linear interpolation or a Kalman filter can be applied as the data is received by a client application, and the synthesized 3D computer 14 graphic world will appear to the audience member 19 as having an accurate and smooth positional representation.

In addition, 10 bits of orientation are added for each of the first 3 values of a quaternion that describes the head orientation of the audience member 19. Because quaternions that describe orientation are always unit length vectors, the 4th value of the quaternion can be reconstructed on the receiving end of the transmission by computing $sqrt(1-qx^2-qy^2-qz^2)$.

Therefore, the total number of bits required to transmit both the position and orientation of a seated audience member 19 with sufficient accuracy to provide that audience member 19 with a high-quality experience is 60 bits, which fits within 8 bytes. In one embodiment, the client application can transmit this data at a rate of n times a second (such as N=20), and the total transmission amount per client application is 8*n bytes (such as 160 bytes) per second, allowing for large numbers of client applications to see an experience simultaneously.

Figure 6:
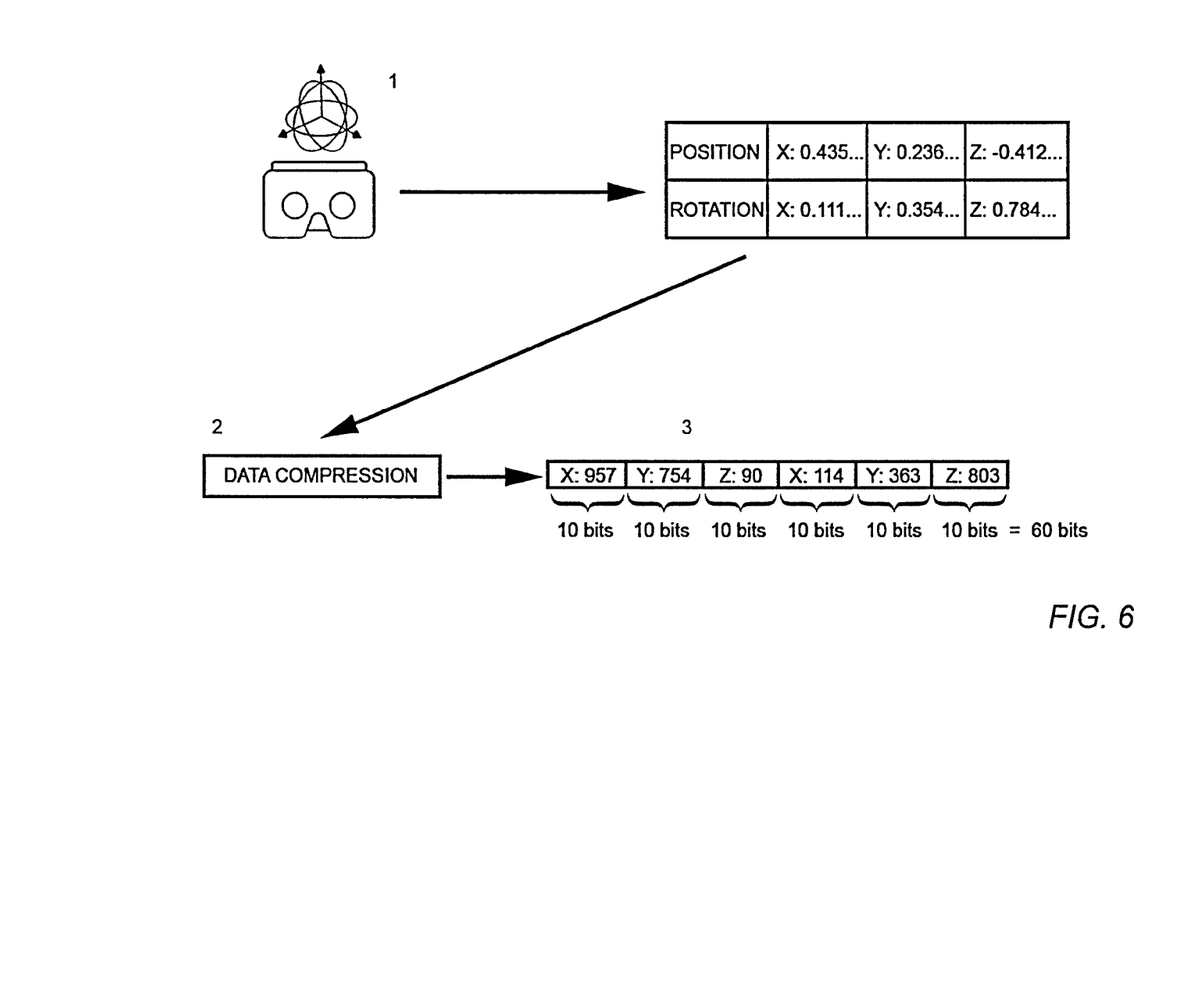
FIG. 6 shows the relationship of position and orientation values and the data compression algorithm.

See FIG. 6.
1. The virtual reality 22 headset 12 produces an XYZ position and XYZ orientation value. This is produced based on the virtual reality 22 headset 12 tracking algorithm, such as the Daydream algorithms in a Lenovo Mirage Solo headset.
2. The data compression algorithm described above is applied.
3. The resulting values require 10 bits of space each, so the total space for the compressed position and orientation comes out to 60 bits, which can be stored in a total of 8 bytes. This data can then be sent from a client application to all other client applications, and the position and orientation of each user can be reconstructed in each experience.

EXAMPLE USE OF INVENTION (WE WALK THROUGH HOW A SHOWING OF CAVE WORKS)

CAVE is a 6-minute virtual reality 22 experience presentable to up to thirty audience members 19. Each audience member 19 is given a different virtual location, with the seats both physical and virtual in a two-wing arrangement. The experience is synchronized using the invention. The thirty audience members 19 see a synchronized virtual reality 22 experience, and can see each other as virtual avatars during the experience. The experience is operated by up to five (5) docents assisting audience members 19 in putting on the headsets 12, and one (1) operator who runs the master client application.

FIG. 7 shows a view of the virtual reality from the perspective of a virtual audience member 18 behind other virtual audience members 18 of the virtual audience 16 and the virtual story that the virtual audience members 18 are seeing.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for viewing a shared virtual reality by physically collocated_audience members in a room comprising:
   a plurality of virtual reality headsets, each headset producing a shared virtual reality that is viewed by audience members wearing the headsets, the headsets are physically collocated on the audience members in the room;
   a communication network to which each headset is in communication to send and receive a virtual orientation and a virtual position associated with each audience member wearing the headsets; and
   a computer in communication with each headset through the network which transmits a virtual audience that is viewed by each headset, the virtual audience formed from the virtual orientation and the virtual position associated with each audience member wearing the headset over time as each audience member views a virtual reality, so each audience member views in the headset the audience member is wearing the virtual story, the virtual orientation and virtual position of each other audience member wearing the headset in the virtual story, the co-located viewers of the shared virtual reality have a shared social experience, with a full benefit of seeing other audience members positions in the shared virtual reality that correspond to their actual locations in the room, as well as seeing where all the other audience members are looking in the shared virtual reality, the computer sends a timestamp to the headsets through the network which the headsets use to synchronize the virtual reality between the headsets so there will not be any difference in perceived time between audience members greater than 100 milliseconds and there will not be any perceived sudden time shifts.

2. The system of claim 1 wherein the virtual position associated with each audience member wearing the headset includes a seat assigned to the headset of each audience member and the audience member in the seat positioned as seated.

3. The system of claim 2 wherein the computer sends to the headset through the network when to play the virtual story.

4. The system of claim 3 wherein the computer sends to the headsets through the network a current time location regarding the virtual reality.

5. The system of claim 4 wherein each headset sends a registration signal through the network to other headsets which includes a runtime representation that is used in the virtual reality to render a representation associated with each headset in the virtual reality.

6. The system of claim 5 wherein each headset sends a virtual position and a virtual orientation associated with the headset to the other headsets.

7. The system of Claim 6 wherein the computer renders each runtime representation of the virtual audience as an avatar whose position and orientation is updated a plurality of times per second.

8. The system of claim 7 wherein the computer renders each avatar in the virtual reality as a seated humanoid model, whose head joint position and orientation are manipulated using the position and orientation received through the network and results each audience member being able to see a virtual visual representation of the position and movements of all other audience members who are currently in each audience member's field of view in the virtual reality.

9. The system of claim 8 wherein the position and orientation of the avatars in the virtual reality correspond to actual physical positions, orientations and movements of the audience members.

10. The system of claim 9 wherein the computer renders a viewpoint in the virtual reality for each headset from the seat assigned to the headset and the audience member of each seat is able to see the movement of all other audience members currently within the audience member's field of vision in the virtual reality thereby supporting a sense for each audience member that they are part of a live physical audience in the virtual reality.

11. The system of claim 10 wherein the computer renders the viewpoint of the virtual reality unique, different and distinct for each headset.

12. The system of claim 11 wherein the computer sends when to play the virtual reality and the current time location regarding the virtual reality as key-value pairs.

13. A method for viewing a shared virtual reality by physically collocated audience members in a room comprising the steps of:
placing virtual reality headsets on heads of audience members, the headsets are physically collocated on the audience members in the room;
sending with a computer a timestamp to the headsets through a network which the headsets use to synchronize the virtual reality between the headsets so there will not be any difference in perceived time between audience members greater than 100 milliseconds and there will not be any perceived sudden time shifts: and
watching a virtual story in the virtual reality in the headset from a virtual audience in the virtual reality, the virtual audience comprising and corresponding to virtual orientations and virtual positions of other persons wearing other virtual reality headsets which also show the virtual story at a same time, the virtual audience and virtual story viewed by the audience member based on the virtual position and virtual orientation of the audience member in the virtual story, with a full benefit of seeing other audience members positions in the virtual story that correspond to their actual locations in the room, as well as seeing where all the other audience members are looking in the virtual story.

14. A non-transitory readable storage medium includes a computer program stored on the storage medium in a non-transient memory for viewing a shared virtual reality by physically collocated audience members in a room having the computer-generated steps of:
watching a virtual story in the virtual reality in a headset from a virtual audience in the virtual reality by a virtual member of the virtual audience, the virtual audience comprising and corresponding to virtual orientations and virtual positions of other persons wearing other virtual reality headsets which also show the virtual story at a same time;
sending a timestamp to the headsets through a network which the headsets use to synchronize the virtual reality between the headsets so there will not be any difference in perceived time between audience members greater than 100 milliseconds and there will not be any perceived sudden time shifts; and
viewing by the audience member from the virtual audience the virtual story based on the virtual position and virtual orientation of the audience member in the virtual story, with a full benefit of seeing other audience members' positions in the virtual story that correspond to their actual locations in the room, as well as seeing where all the other audience members are looking in the virtual story.

* * * * *